(12) United States Patent
Faynberg et al.

(10) Patent No.: US 9,338,119 B2
(45) Date of Patent: May 10, 2016

(54) DIRECT ELECTRONIC MAIL

(75) Inventors: Igor Faynberg, East Brunswick, NJ (US); Hui-Lan Lu, Marlboro, NJ (US); Francois Cosquer, Orgeval (FR)

(73) Assignee: Alcatel Lucent, Boulogne-Billancourt (FR)

( * ) Notice: Subject to any disclaimer, the term of this patent is extended or adjusted under 35 U.S.C. 154(b) by 532 days.

(21) Appl. No.: 13/596,363

(22) Filed: Aug. 28, 2012

(65) Prior Publication Data

US 2014/0067962 A1 Mar. 6, 2014

(51) Int. Cl.
*G06F 15/16* (2006.01)
*H04L 12/58* (2006.01)

(52) U.S. Cl.
CPC .............. *H04L 51/30* (2013.01); *H04L 51/12* (2013.01)

(58) Field of Classification Search
CPC .............................. H04L 51/83; H04L 51/12
USPC ......................................................... 709/206
See application file for complete search history.

(56) References Cited

U.S. PATENT DOCUMENTS

| 7,752,440 | B2 | 7/2010 | Faynberg et al. | |
| 8,732,452 | B2 * | 5/2014 | Byrum et al. ................. | 713/153 |
| 2006/0020667 | A1 * | 1/2006 | Wang et al. .................... | 709/206 |
| 2006/0168074 | A1 * | 7/2006 | Gardner et al. ............... | 709/206 |
| 2007/0234408 | A1 | 10/2007 | Burch et al. | |
| 2008/0114833 | A1 * | 5/2008 | McLoughlin ................. | 709/204 |
| 2010/0318642 | A1 | 12/2010 | Dozier | |

FOREIGN PATENT DOCUMENTS

| JP | 2008523486 A | 7/2008 | |
| JP | 2009527047 A | 7/2009 | |
| JP | 2010502109 A | 1/2010 | |
| WO | 2006061326 A1 | 6/2006 | |
| WO | 2007094772 A1 | 8/2007 | |
| WO | 2008015669 A2 | 2/2008 | |
| WO | 2008024454 A1 | 2/2008 | |
| WO | WO 2008015669 A2 * | 2/2008 | ............. G06Q 10/00 |
| WO | 2010151873 A1 | 12/2010 | |
| WO | 2011047722 A1 | 4/2011 | |
| WO | 2011162838 A1 | 12/2011 | |
| WO | PCTUS2013055077 | 9/2013 | |

OTHER PUBLICATIONS

J. Klensin, "Simple Mail Transfer Protocol," Internet Engineering Task Force (IETF) Request for Comments: 5321, Oct. 2008, 95 pages.
P. Resnick, "Internet Message Format," Internet Engineering Task Force (IETF) Request for Comments: 5322, Oct. 2008, 57 pages.

(Continued)

*Primary Examiner* — Kristie Shingles
*Assistant Examiner* — Timothy Sowa
(74) *Attorney, Agent, or Firm* — Ryan, Mason & Lewis, LLP (57) ABSTRACT

Techniques for enabling improved electronic mail handling in communication networks include a method of handling an electronic mail message in an electronic mail system. The method includes establishing a secure connection between a client of a message sender and a server of a message recipient in the electronic mail system. The method also includes participating in an authentication exchange to verify the identity of the message sender. The method further includes the message sender depositing an electronic mail message with the server of the message recipient upon successful verification of the identity of the client of the message sender.

20 Claims, 6 Drawing Sheets

(56) References Cited

OTHER PUBLICATIONS

R. Fielding et al., "Hypertext Transfer Protocol—HTTP/1.1," Internet Engineering Task Force (IETF) Request for Comments: 2616, Jun. 1999, 114 pages.

J. Rosenberg et al., "TCP Candidates with Interactive Connectivity Establishment (ICE)," Internet Engineering Task Force (IETF) Request for Comments: 6544, Mar. 2012, 31 pages.

T. Dierks et al., "The Transport Layer Security (TLS) Protocol Version 1.2," Internet Engineering Task Force (IETF) Request for Comments: 5246, Aug. 2008, 104 pages.

D. Hardt, "The OAuth 2.0 Authorization Framework draft-ietf-oauth-v2-30," Internet Engineering Task Force (IETF) Internet-Draft, Jul. 2012, 49 pages.

* cited by examiner

DIRECT ELECTRONIC MAIL

FIELD

The present application relates generally to communication networks and, more particularly, to techniques for enabling improved electronic mail processing in such communication networks.

BACKGROUND

The existing electronic mail (email) system employed within the World Wide Web is described in the Internet Engineering Task Force (IETF) Request for Comment (RFC) 5321 entitled "Simple Mail Transfer Protocol" (SMTP) and RFC 5322 entitled "Internet Message Format," the disclosures of which are incorporated by reference herein in there entireties.

Typically, an email is generated by a sender via an email client application and provided to an SMTP server to handle the sending of the email to a recipient. The SMTP server may communicate with other SMTP servers to deliver the email. More specifically, the email client application informs the SMTP server of the address of the sender and the address of the recipient, and provides the body of the message. In the case when the email is to be delivered to an external domain, the originating SMTP server communicates with a domain name server (DNS), which replies with the one or more Internet Protocol (IP) addresses for the SMTP server(s) for the external (destination) domain. The originating SMTP server communicates with one of the destination SMTP servers, and provides the email to the destination SMTP server. The SMTP servers communicate via server-to-server protocols.

In addition to the necessity for various server-to-server protocols, another major drawback of the existing email system is the presence of unsolicited mail (or "spam"), including its malicious forms such as phishing (i.e., attempting to acquire information by masquerading as a trustworthy entity in an electronic communication) and virus distribution.

SUMMARY

Embodiments of the invention provide techniques for enabling improved electronic mail handling in communication networks.

For example, in one embodiment, a method of handling an electronic mail message in an electronic mail system comprises the following steps. A secure connection is established between a client of a message sender and a server of a message recipient in the electronic mail system. An authentication exchange is employed to verify the identity of the client of the message sender. The client of the message sender deposits an electronic mail message with the server of the message recipient upon successful verification of the identity of the client of the message sender.

In another embodiment, a method of handling an electronic mail message in an electronic mail system comprises the following steps. A secure connection is established between a client of a message sender and a server of a message recipient in the electronic mail system. An authentication exchange is employed to verify the identity of the client of the message sender. The server of the message recipient receives an electronic mail message sent by the client of the message sender upon successful verification of the identity of the client of the message sender.

In yet another embodiment, an apparatus for handling electronic mail messages in an electronic mail system comprises a processor coupled to the memory and configured to execute a client or server to perform the above-mentioned steps for a given method.

In a further embodiment, an article of manufacture comprises a processor-readable storage medium that stores one or more software programs which when executed by a processor perform the above-mentioned steps for a given method.

Advantageously, illustrative embodiments of the invention reduce or eliminate unsolicited emails by providing for sender authentication, and reduce or eliminate server-to-server protocols needed to deliver an email message in existing email message systems.

These and other features and advantages of the present invention will become more apparent from the accompanying drawings and the following detailed description.

DETAILED DESCRIPTION

Embodiments of the invention will be described below in the context of illustrative communication protocols. However, it is to be appreciated that embodiments of the invention are not limited to any particular communication protocols. Rather, embodiments of the invention are applicable to any suitable communication environment where it would be desirable to provide improved electronic mail handling.

The phrase "communication network" as used herein is generally defined as any communication network or system capable of transporting one or more types of media including, but not limited to, text-based data, graphics-based data, voice-based data and video-based data. In the case of an electronic mail system implemented across such a communication network, typically messages (emails) sent via the electronic mail system are text-based messages. However, these text-based messages can have attachments that contain other types of media (e.g., video, image, audio, graphics, and text as well).

The phrase "secure connection" as used herein is generally defined as a communication connection whose confidentiality or integrity (or both) are protected by cryptographic means based on the authentication of involved entities. In addition, typically, messages delivered over a secure connection cannot be replayed.

Also, as used herein, a "server" is generally defined as one or more computing devices and/or one or more software programs that perform one or more functions upon request from a communication network, a client and/or another server. Thus, for example, an "email server" performs one or more email delivery functions. The servers employed in illustrative embodiments of the invention are assumed to be Web servers (i.e., they are assumed to support the HyperText Transfer Protocol (HTTP) standard).

A "client," as used herein, is generally defined as one or more computing devices and/or one or more software programs that request one or more functions from a communication network, a server, and/or another client. Examples of devices associated with a client may include, but are not limited to, cellular phones, smart phones, tablets, desktop phones, personal digital assistants, laptop computers, personal computers, etc. Also, a computing device or software program may be a server for one purpose and a client for another purpose, a key defining element being the respective function with respect to the HTTP protocol.

Thus, in one example, an "email client" requests one or more email delivery functions from an "email server." The email client may also provide a user with the capability, inter alia, of reading emails and creating emails.

Returning to the above discussion of the existing email system, a main reason why authentication is difficult in the existing email system is that the system employs multiple mail servers along with an inter-server protocol exchange and various access protocols. A major problem with the existing email system is that it is atavistic, i.e., it was designed in 1970's and it reflects a pre-Web infrastructure. At that time, networking was unreliable and therefore direct real-time synchronous communications between a client and a remote server were not considered. Today, with global connectivity and load balancing at servers, the situation has changed drastically. While not limited thereto, illustrative embodiments of the invention draw on the state of the art in Web deployment.

Thus, it is realized here that with the advance of the global server discovery and client-to-server connectivity, the existing email system can be significantly simplified. Accordingly, in one or more embodiments of the invention, we change the existing e-mail infrastructure, in which the recipient and the sender of the message have separate servers, so that a single server for a recipient of the email is employed. That is, a recipient does not have multiple servers associated therewith in order for an email to be delivered to it. The sender needs simply to connect to the single recipient server to deliver the email, thus eliminating the necessity for any server-to-server protocol.

Since it is this server-to-server protocol that has been missing the authentication feature, in addition to being unnecessarily complex in the presence of global connectivity and "on-demand" computing power, embodiments of the invention eliminate the problem altogether. More particularly, embodiments of the invention provide for a sender to deposit email directly (direct email) into the recipient's server and allow the server to authenticate the sender according to the recipient's needs.

Thus, direct email (which we term herein as "dmail") considerably simplifies the existing email system infrastructure and also prevents unauthenticated postings. In one example, the term "direct" refers to the email client and the email server being end-points in terms of the application layer of the Internet Protocol (IP). As is known, in the TCP/IP (Transmission Control Protocol/Internet Protocol) protocol suite, the application layer contains protocols and methods that fall into the category of process-to-process communications across an IP network. The Open Systems Interconnection model (OSI model) of computer networking also specifies a group of protocols and methods identified by the name application layer. Thus, communications between a client of the email sender and a server of the message recipient (wherein, for example, the message recipient presumably is another email client or a destination email client) are direct in the sense that the client of the email sender and the server of the email recipient communicate one-to-one at the application layer. It is to be understood that this does not mean that the email message may not pass through intermediary devices/servers (e.g., proxies, firewalls, routers, and switches) that reside between the devices that implement the email client and the email server, but the presence of intermediary devices/servers is irrelevant to the dmail delivery.

In one or more embodiments, the direct mail concept is based on browser technology including HTTP (as described, for example, in IETF RFC 2616, the disclosure of which is incorporated by reference herein in its entirety), the Web-Socket protocol (as described, for example, in IETF RFC 6544, the disclosure of which is incorporated by reference herein in its entirety), and HTML5 (HyperText Markup Language Version 5 as developed by the World Wide Web Consortium (W3C)). It is to be understood that HTML5 typically applies to client-side programming matters.

In one embodiment, the dmail client may be implemented natively or as a Web application accessed via a browser program. Advantageously, a dmail system replaces the pre-Web email relay infrastructure with instant communication to the recipient's mail server. Yet, the new methodology/protocol can easily coexist with existing SMTP mail server functions, especially on the receiving side.

Figure 1:
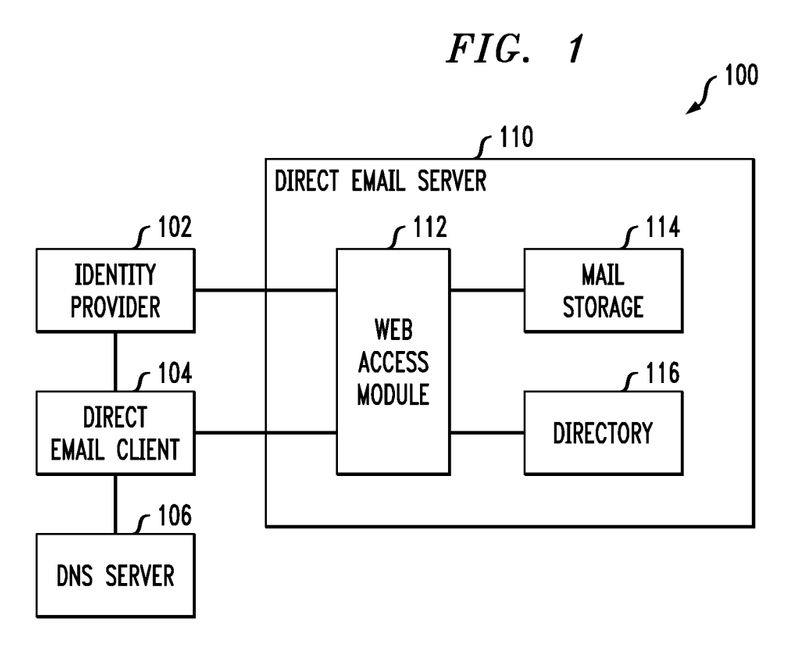
FIG. 1 is a diagram illustrating a direct electronic mail system, according to one embodiment of the invention.

FIG. 1 is a diagram illustrating a direct electronic mail (dmail) system, according to one embodiment of the invention. More particularly, the figure shows an embodiment where the interface between the dmail client and dmail server is based on HTTP.

As shown, dmail system 100 comprises an identity provider 102, a dmail client 104, a DNS server 106 and a dmail server 110. The dmail server 110 comprises a Web access module 112, mail storage 114 and directory 116.

Identity provider 102 is a provider entity that creates, maintains, and manages identity information for entities and provides entity authentication to other service providers within a communication network.

Dmail client 104, as mentioned above, can be one or more computing devices and/or one or more software programs that manage electronic messages for an entity. Examples of devices associated with a dmail client may include, but are not limited to, cellular phones, smart phones, tablets, desktop phones, personal digital assistants, laptop computers, personal computers, etc. Thus, the client can be considered one or more of these devices and/or one or more software programs associated with such device(s).

DNS server 106 is a domain name server which provides IP addresses of dmail servers associated with intended message recipients to the dmail client 104 upon request.

Web access module 112 is a module in the email server that implements the server side of the HTTP protocol.

Directory 116 is a directory associated with the file system of the email server 110.

Mail storage 114 is the memory wherein dmail messages deposited by email clients are stored.

Figure 2:
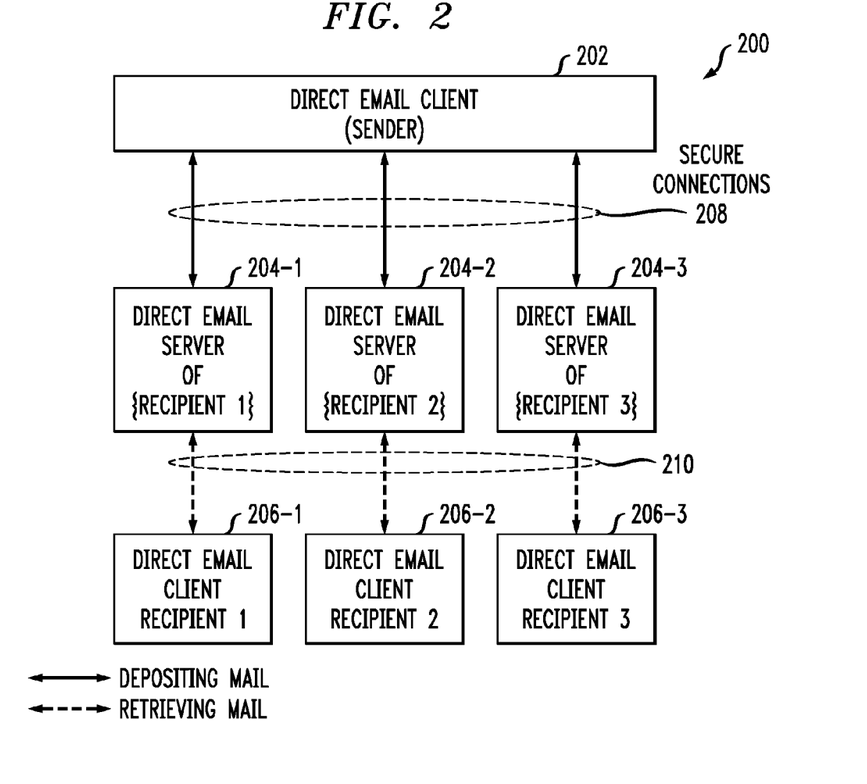
FIG. 2 is a diagram illustrating establishment of secure connections between clients and servers in a direct electronic mail system, according to one embodiment of the invention.

FIG. 2 is a diagram illustrating establishment of secure connections between client and servers in a direct electronic mail system, according to one embodiment of the invention. That is, in order to deposit or retrieve a message, the dmail client establishes a secure connection with the dmail server as illustrated in FIG. 2.

As shown, dmail client 202 is in communication with dmail servers 204-1, 204-2 and 204-3. Advantageously, at the application layer, the dmail client is in direct communication with the dmail servers, as explained above. Thus, there is no need for any server-to-server protocols associated with the traditional SMTP email system since there is only one server at the application level, i.e., the server of the email recipient, with which the email sender has to communicate to deposit the email message.

Each dmail server is a dmail server for one or more given dmail clients. For example, dmail server 204-1 is a dmail server of dmail client 206-1, dmail server 204-2 is a dmail server of dmail client 206-2, and dmail server 204-3 is a dmail server of dmail client 206-3. In this example scenario, dmail client 202 is the dmail "sender" or dmail source and thus deposits one or more email messages at one or more of dmail servers 204-1, 204-2 and 204-3, while one or more of dmail clients 206-1, 206-2 and 206-3 are dmail "recipients" or dmail destinations and this retrieve one or more deposited email messages from one or more of dmail servers 204-1, 204-2 and 204-3. Of course, dmail client 202 may also be a recipient of other emails while any one or more of dmail clients 206-1, 206-2 and 206-3 may also be senders of other emails.

Secure connections 208 are respectively established between dmail client 202 and the dmail servers 204-1, 204-2 and 204-3, while secure connections 210 are respectively established between dmail clients 206-1, 206-2 and 206-3 and the dmail servers 204-1, 204-2 and 204-3. Examples of such secure connections will be further described below.

Figure 3:
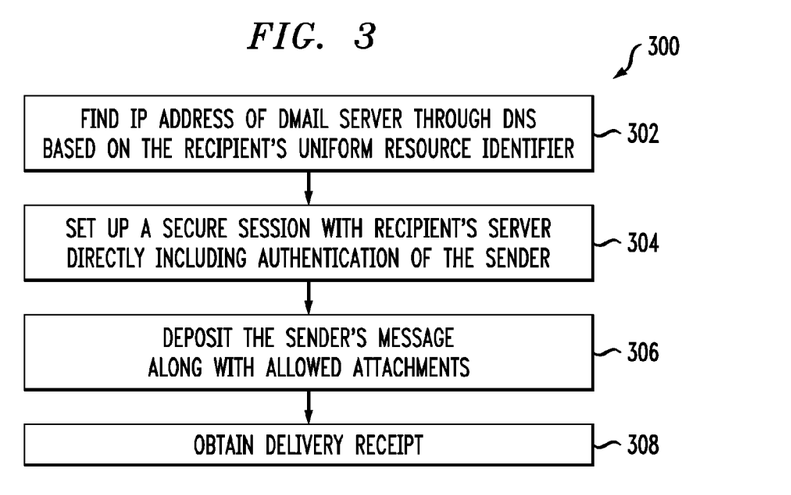
FIG. 3 is a diagram illustrating a methodology performed by a direct electronic mail client, according to an embodiment of the invention.

FIG. 3 illustrates a methodology 300 for the deposit of an email message by the dmail client to a dmail server (e.g., dmail client 202 to dmail server 204-1, 204-2 or 204-3 in FIG. 2).

In step 302, the dmail client finds the IP address of the subject dmail server through a DNS server (e.g., DNS server 106 in FIG. 1) based on the uniform resource identifier or URI of the recipient (e.g., dmail://igor.faynberg@alcatel-lucent.com). Thus, with reference again to FIG. 2, if the URI of the email recipient associated with dmail client 206-3 is dmail://igor.faynberg@alcatel-lucent.com, then the sending dmail client 202 obtains from the DNS server the IP address of the dmail server of the dmail recipient, in this case, dmail server 204-3.

In step 304, the dmail client sets up a secure session (e.g., secure connection 208 in FIG. 2) directly with the dmail server of the recipient. Sender authentication is obtained and certain types of attachments may be forbidden in accordance with the email provider's policy or recipient's preference or both.

In the case of connectivity failure, the dmail client is responsible for implementing retrial, according to configurable parameters, using its own storage until the connection is established, just as in the case of the existing e-mail standard procedure. The client's own storage can of course be used for working off-line, in the case of no connectivity, as is currently done with e-mail software.

In step 306, the dmail client deposits the sender's message, along with any allowed attachments.

In step 308, the dmail client obtains a delivery receipt. In one example, the receipt may be a signed hash of the message along with the date and time of its receipt.

Note that it is through step 304 that email security enhancements are achieved in accordance with illustrative embodiments of the invention. As an example, FIG. 4 further describes the dmail client-dmail server interaction including an example of the establishment of a secure session.

Figure 4:
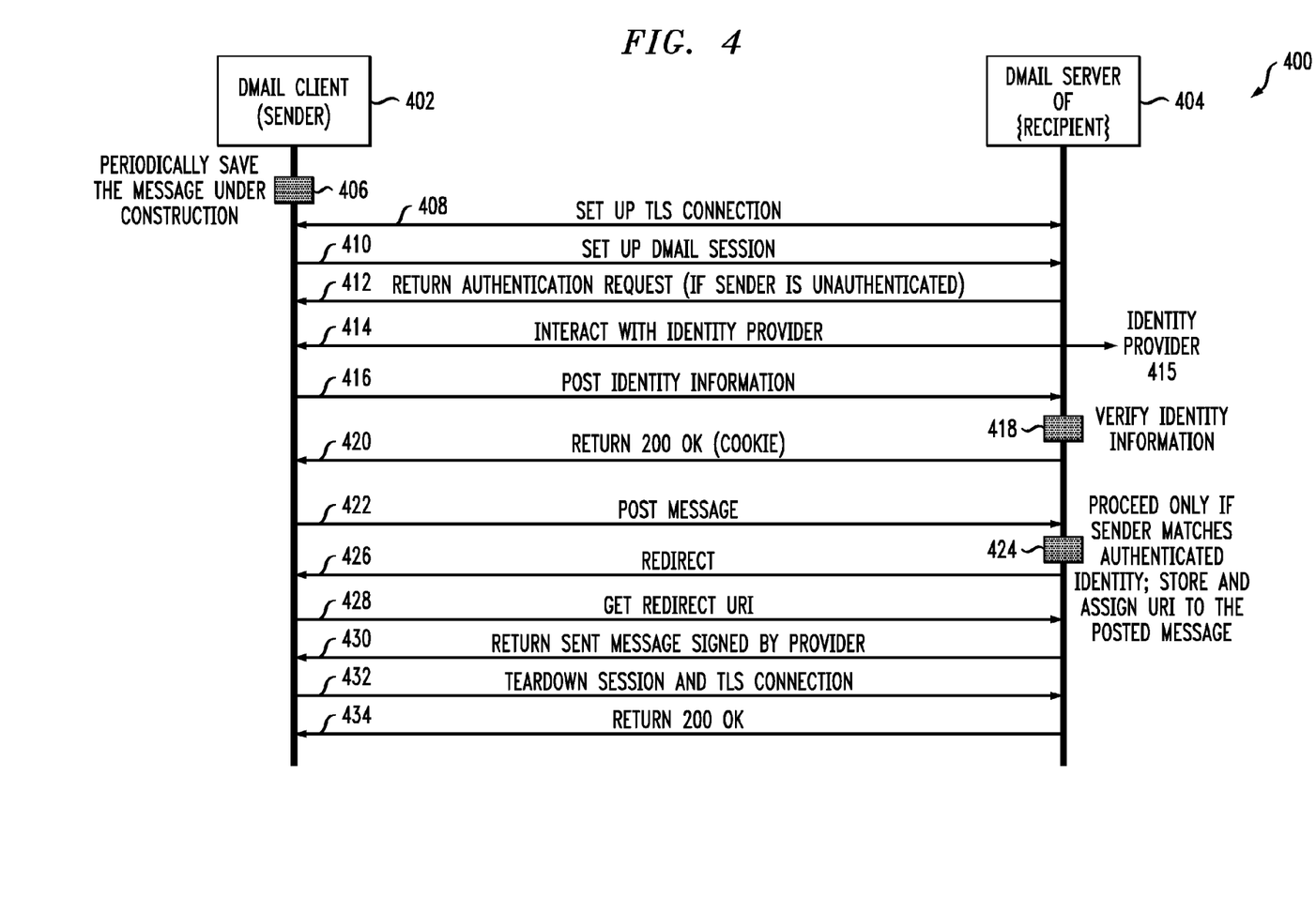
FIG. 4 is a diagram illustrating a message flow for an authentication operation in a direct electronic mail system, according to an embodiment of the invention.

FIG. 4 is a diagram illustrating a message flow for an authentication operation in a direct electronic mail system, according to an embodiment of the invention. More particularly, FIG. 4 shows a protocol 400 between dmail client 402 and dmail server 404. Dmail server 404 is a dmail server of a particular message recipient (not shown).

As shown, in step 406, the dmail client periodically saves the email message while the author of the email creates the message.

The protocol 400 starts with the dmail client 402 and the dmail server 404 setting up a Transport Layer Security (TLS) connection in step 408. As is known, TLS is a cryptographic protocol that provides security over the Internet and is defined in IEFT RFC 5246 entitled "The Transport Layer Security (TLS) Protocol," Version 1.2, the disclosure of which is incorporated by reference herein in its entirety. The TLS connection protects communications between the dmail client and the dmail server. The TLS connection may also protect communications between the dmail client and an identity provider to be further mentioned below. If the identity provider is within the same intranet as the dmail client, then a TLS connection would typically not be deployed.

In step 410, a dmail session set up request is sent from the dmail client 402 to the dmail server 404. The dmail server 404 sends a return authentication request to the dmail client, in step 412, if the dmail client 402 is unauthenticated. In step 414, the dmail client 402 interacts with an identity provider 415, to whom it proves its identity. As a result of that, the dmail client 402 receives a token or an assertion (identity information) that it can present to the dmail server 404 to prove that it is what/whom it claims to be.

The dmail client 402 sends the identity information to the dmail server 404 via an HTTP POST request in step 416. In step 418, the dmail server 404 verifies the identity information. To do so, the dmail server can communicate with the identity provider 415 separately, but this can be skipped if there is an appropriately-signed token. In this case, the identity provider 415 need only verify the signature of the server.

If the dmail client 402 is verified, the dmail server 404 sends an acknowledgment message (HTTP RETURN 200 OK message) to the dmail client 402 in step 420.

Once authenticated, the dmail client 402 deposits the email message with the dmail server 404 via an HTTP POST request in step 422. As shown in step 424, dmail server 404 proceeds with handling the email message if the sender of the message (in step 422) matches the authenticated identity (i.e. the entity that was verified in step 418). If so, then dmail server 404 stores and assigns a URI to the posted message.

Dmail server 404 sends an HTTP Redirect command to dmail client 402, in step 426. In response, in step 428, dmail client 402 issues an HTTP GET request to dmail server 404 to obtain the redirected URI (i.e., the URI assigned to the email message in step 424 by dmail server 404). This Post-Redirect-Get procedure is common in a Representational State Transfer (REST) framework, i.e., a Web service design model used in distributed communication networks such as the World Wide Web. PRG is used because the server typically has no state, and it is the combination of the three methods (PRG) that allows the client to look at the resource. For example, when you fill in a form to get an order on the Web, you would not be able to see it once you click to send it. It is PRG that results in the creation of the resource to which you can return. Thus, the same PRG procedure allows the client to access the email message it deposited that is now stored on the dmail server.

In step 430, dmail server 404 sends dmail client 402 an acknowledgment message signed by the dmail server 404 that the email message deposited by dmail client 402 was sent to the message recipient (not shown).

In step 432, dmail client 402 sends a request to dmail server 404 to tear down the dmail session and the TLS connection. An acknowledgment message (HTTP Return 200 OK) is sent by dmail server 404 to dmail client 402 in step 434. Note that the message recipient (another dmail client) will receive the deposited email message when it requests its messages from dmail server 404. The dmail client of the message recipient may be prompted to check for newly deposited emails.

It is to be appreciated that, in illustrative embodiments, interactions among dmail client 402, dmail server 404 and identity provider 415 may be through identity federation or OAuth 2.0 protocols or the like. As is known, "identity federation" is a protocol for relating multiple identities such that disparate systems can interact, while OAuth 2.0 is an open standard for authentication and is defined in the IETF Internet-Draft entitled "The OAuth 2.0 Authorization Framework draft-ieft-oauth-v2-30" dated Jul. 15, 2012, the disclosure of which is incorporated by reference herein in its entirety.

Figure 5:
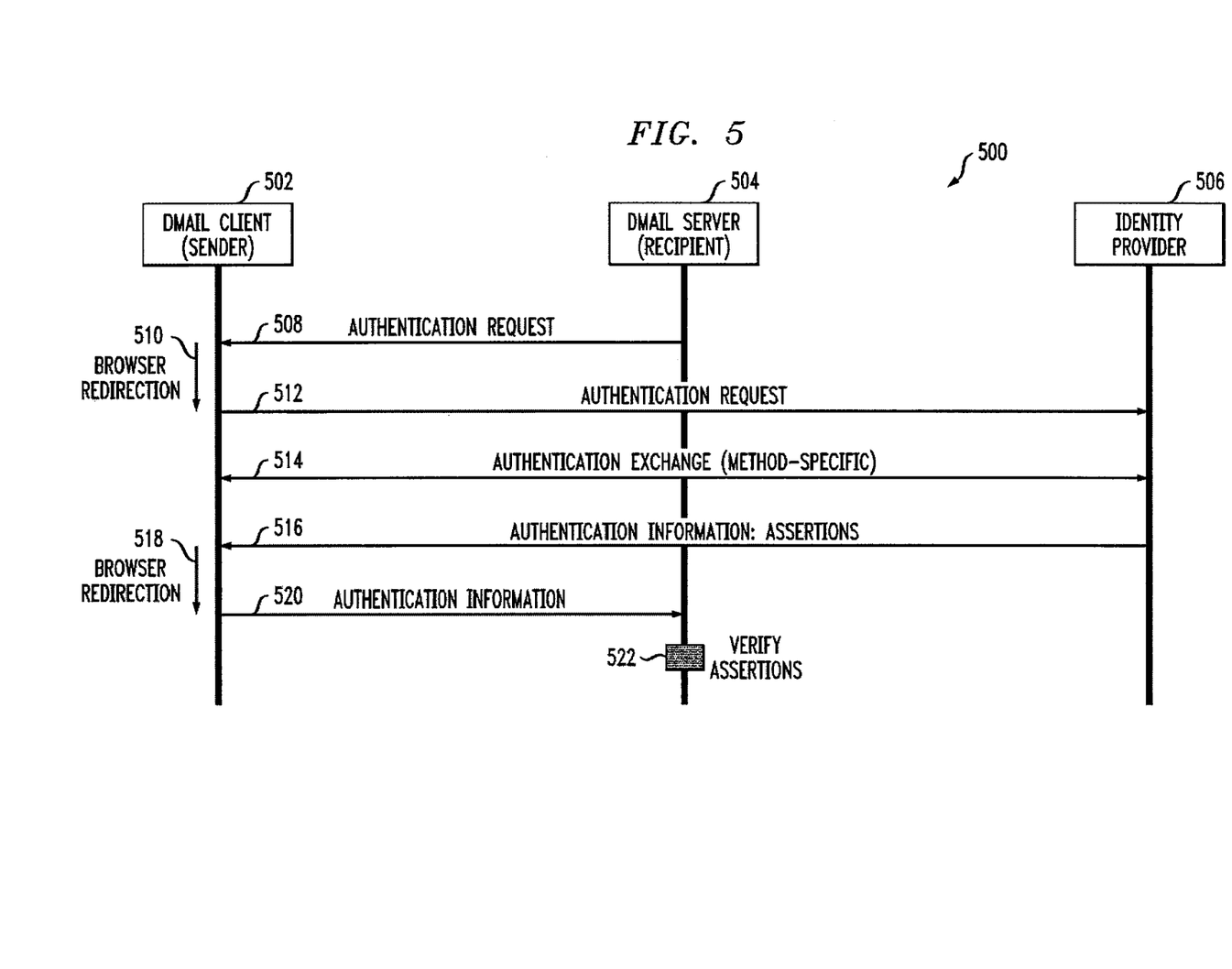
FIG. 5 is a diagram illustrating a message flow for an authentication operation in a direct electronic mail system, according to another embodiment of the invention.

FIG. 5 is a diagram illustrating a message flow for an authentication operation in a direct electronic mail system, according to another embodiment of the invention. More particularly, FIG. 5 shows the interaction through identity federation.

As shown, protocol 500 is performed between dmail client 502, dmail server 504, and identity provider 506. Note that steps 508 through 522 in FIG. 5 correspond to steps 412 through 418 in FIG. 4.

In step 508, dmail server 504 sends an authentication request to dmail client 502. In response, in step 510, the browser program of dmail client 502 is redirected to identity provider 506. The authentication request is then sent from dmail client 502 to identity provider 506 in step 512.

In step 514, there is an authentication exchange between dmail client 502 and identity provider 506. The exchange is method-specific wherein the method may be any existing authentication methodology employed in identity federation environments, for example, Basic HTTP Digest, Public Key Infrastructure, Kerberos, OPENID®, OPENID® Connect, or SAML (Security Assertion Markup Language).

As a result of the authentication exchange, identity provider 506 provides dmail client 502 with authentication information (e.g., assertions) in step 516. The browser of the dmail client 502 is redirected back to dmail server 506 in step 518. The authentication information is then provided by dmail client 502 to dmail server 504 in step 520. Dmail server 506 then verifies the assertions in step 522 through checking a signature or via direct communication with the identity provider 506.

Figure 6:
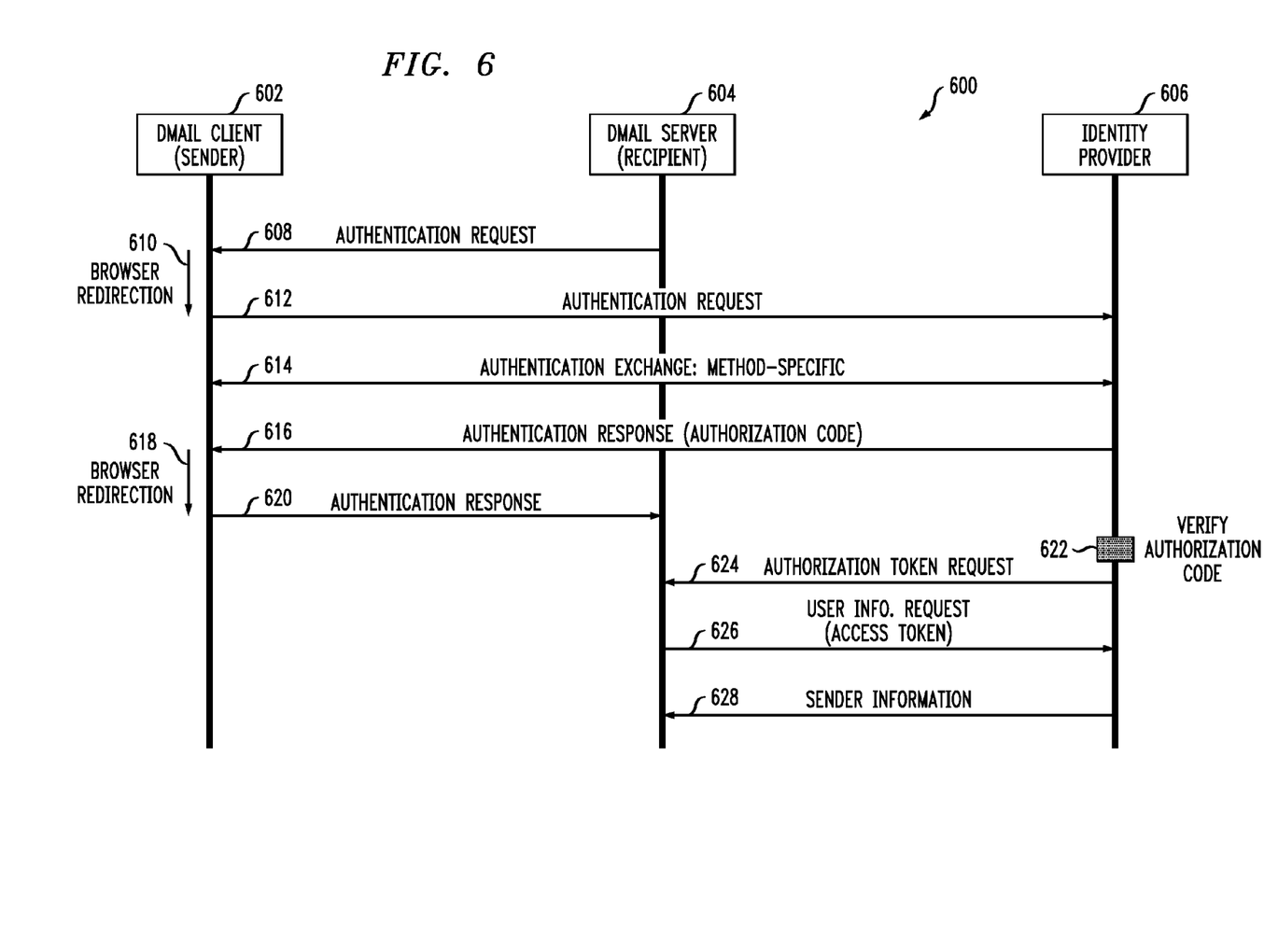
FIG. 6 is a diagram illustrating a message flow for an authentication operation in a direct electronic mail system, according to yet another embodiment of the invention.

FIG. 6 is a diagram illustrating a message flow for an authentication operation in a direct electronic mail system, according to yet another embodiment of the invention. More particularly, FIG. 6 shows the interaction through OAuth 2.0.

As shown, protocol 600 is performed between dmail client 602, dmail server 604, and identity provider 606. Note that steps 608 through 628 in FIG. 6 correspond to steps 412 through 418 in FIG. 4.

In step 608, dmail server 604 sends an authentication request to dmail client 602. In response, in step 610, the browser program of dmail client 602 is redirected to identity provider 606. The authentication request is then sent from dmail client 602 to identity provider 606 in step 612.

In step 614, there is an authentication exchange between dmail client 602 and identity provider 606. The exchange is method-specific wherein the method may be any existing authentication methodology employed in open standard authentication environments, for example, HTTP basic, Kerberos, or via a private-key signature supplemented by the X.509 certificate chain.

As a result of the authentication exchange, identity provider 606 provides dmail client 602 with an authentication response (e.g., authorization code) in step 616. The browser of the dmail client 602 is redirected back to dmail server 606 in step 618. The authentication response is then provided by dmail client 602 to dmail server 604 in step 620. Dmail server 606 then verifies the authorization code in step 622. In step 624, identity provider 606 requests an authorization token from dmail server 604. Dmail server 604 provides a user information request (e.g., access token) to identity provider 606 in step 626. In response, identity provider 606 provides dmail server 604 with sender (dmail client 602) information, thus allowing dmail server 604 to verify the identity of dmail client 602.

It is to be further appreciated that in order to retrieve an email message deposited with a dmail server, the retrieving user (another dmail client not shown in FIGS. 5 and 6) also needs to be authenticated. In one or more illustrative embodiments, the authentication flow for the email client of the message recipient is similar to the message flows respectively illustrated in FIGS. 5 and 6, and thus will be realized by one ordinarily skilled in the art in a straightforward manner from the detailed descriptions herein.

Figure 7:
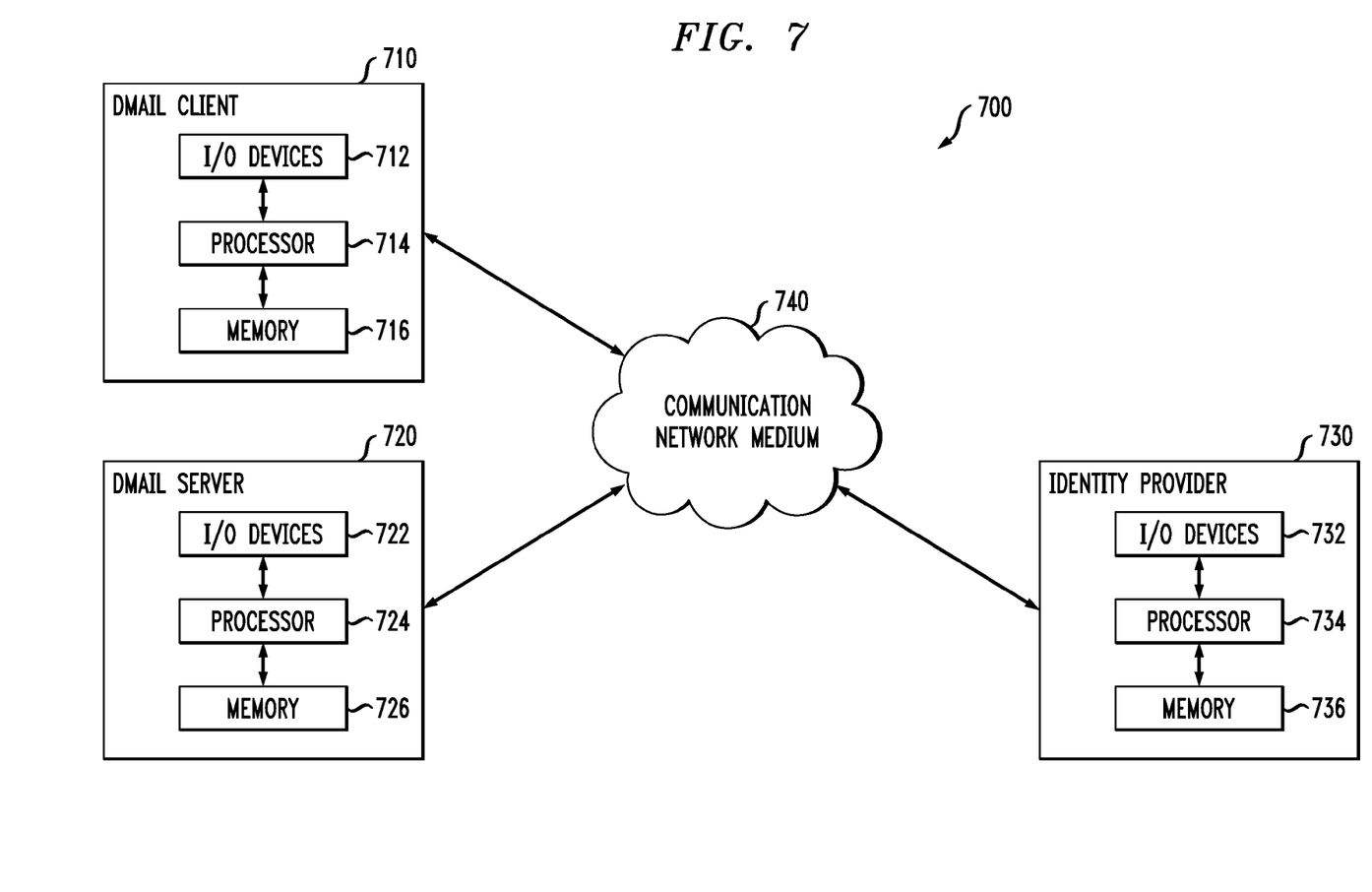
FIG. 7 is a diagram illustrating a computing architecture of a communication network suitable for implementing a direct electronic mail system, according to an embodiment of the invention.

Lastly, FIG. 7 illustrates a computing architecture of a communication network 700 suitable for implementing direct electronic mail including authentication procedures according to one or more embodiments of the invention.

As shown, computing device 710 (e.g., corresponding to a dmail client), computing device 720 (e.g., corresponding to a dmail server), and computing device 730 (e.g., corresponding to an identity provider) are operatively coupled via communication network medium 740. The network medium may be any network medium across which the computing devices are operable to communicate. By way of example, the network medium can be any medium that is part of the World Wide Web. However, embodiments of the invention are not limited to a particular type of network medium.

As would be readily apparent to one of ordinary skill in the art, the servers, clients, and other computing devices, may be implemented as programmed computers operating under control of computer program code. The computer program code would be stored in a non-transitory computer (or processor or machine) readable storage medium (e.g., a memory) and the code would be executed by a processor of the computer. Given this disclosure of various illustrative embodiments of the invention, one ordinarily skilled in the art could readily produce appropriate computer program code in order to implement the protocols described herein.

Nonetheless, FIG. 7 generally illustrates an exemplary architecture for each device communicating over the network medium. As shown, dmail client device 710 comprises I/O devices 712, processor 714, and memory 716. Dmail server device 720 comprises I/O devices 722, processor 724, and memory 726. Identity provider device 730 comprises I/O devices 732, processor 734, and memory 736.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., computer display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (710, 720, and 730) shown in FIG. 7 may be individually programmed to perform their respective steps of the methodologies and protocols depicted in FIGS. 3 and 6.

Advantageously, embodiments of the invention simplify the current (outdated) email system while providing a straightforward mechanism for sender authentication and content control to eliminate spam. More particularly, embodiments provide for authentication of email senders. As a result, spam through sender impersonation can be eliminated completely. In addition, embodiments simplify the entire email delivery infrastructure and significantly reduce the number of replicated messages throughout the system by allowing for direct deposit of an email message at the email server of the message recipient by the client of the message sender (thus, replication of the message at mail proxies in the email system is avoided). Embodiments also are applicable to Web services. That is, the steps/operations performed by the email client can be performed either by one or more stand-alone applications or by a Javascript applet executed within the browser of the client, or even by an HTML5-written page.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of handling electronic mail messages in an electronic mail system, the method comprising:
   establishing a secure connection between a client of a message sender and a first mail server of a message recipient in the electronic mail system, the first mail server of the message recipient being distinct from a second mail server associated with the message sender;
   participating in an authentication exchange to verify the identity of the client of the message sender; and
   upon successful verification of the identity of the client of the message sender, the client of the message sender depositing an electronic mail message with the first mail server of the message recipient;
   wherein the client of the message sender and the first mail server of the message recipient communicate one-to-one at an application layer of the electronic mail system;
   wherein the client of the message sender and the first mail server of the message recipient comprise respective endpoints in the application layer; and
   wherein the client of the message sender depositing the electronic mail message with the first mail server of the message recipient does not require any server-to-server protocols between the first mail server of the message recipient and the second mail server associated with the message sender.

2. The method of claim 1, further comprising receiving, at the client of the message sender, an acknowledgment that the electronic mail message has been delivered to the first mail server of the message recipient.

3. The method of claim 1, further comprising the client of the message sender obtaining a delivery address based on an identifier of the message recipient, the delivery address comprising an address of the first mail server of the message recipient.

4. The method of claim 3, wherein the client of the message sender obtains the delivery address from a domain name server.

5. The method of claim 1, wherein the authentication exchange also involves an identity provider.

6. The method of claim 1, wherein the authentication exchange is performed in accordance with an identity federation protocol.

7. The method of claim 1, wherein the authentication exchange is performed in accordance with an open standard authentication protocol.

8. The method of claim 1, wherein at least part of the communications between the client of the message sender and the first mail server of the message recipient utilizes the HyperText Transport Protocol.

9. An article of manufacture comprising a non-transitory processor-readable storage medium storing one or more software programs which when executed by a processor perform the steps of the method of claim 1.

10. An apparatus for handling electronic mail messages in an electronic mail system, the apparatus comprising:
    a memory; and
    a processor coupled to the memory and configured to execute a client of a message sender such that the client when executed: establishes a secure connection between the client of the message sender and a first mail server of a message recipient, the first mail server of the message recipient being distinct from a second mail server associated with the message sender; participates in an authentication exchange to verify the identity of the client; and upon successful verification of the identity of the client, deposits an electronic mail message with the first mail server of the message recipient;
    wherein the client of the message sender and the first mail server of the message recipient communicate one-to-one at an application layer of the electronic mail system;
    wherein the client of the message sender and the first mail server of the message recipient comprise respective endpoints in the application layer; and
    wherein the client of the message sender depositing the electronic mail message with the first mail server of the message recipient does not require any server-to-server protocols between the first mail server of the message recipient and the second mail server associated with the message sender.

11. A method of handling electronic mail messages in an electronic mail system, the method comprising:
    establishing a secure connection between a client of a message sender and a first mail server of a message recipient in the electronic mail system, the first mail server of the message recipient being distinct from a second mail server associated with the message sender;
    participating in an authentication exchange to verify the identity of the client of the message sender; and
    upon successful verification of the identity of the client of the message sender, the first mail server of the message recipient receiving an electronic mail message sent by the client of the message sender;
    wherein the first mail server of the message recipient and the client of the message sender communicate one-to-one at an application layer of the electronic mail system;

wherein the client of the message sender and the first mail server of the message recipient comprise respective endpoints in the application layer; and wherein the first mail server of the message recipient receiving the electronic mail message sent by the client of the message sender does not require any server-to-server protocols between the first mail server of the message recipient and the second mail server associated with the message sender.

12. The method of claim 11, further comprising the first mail server of the message recipient delivering the electronic mail message to a client of the message recipient.

13. The method of claim 12, wherein the electronic mail message is delivered to the client of the message recipient upon request by the client of the message recipient.

14. The method of claim 12, further comprising, prior to delivery of the electronic mail message to the client of the message recipient:
establishing a secure connection between the client of the message recipient and the first mail server of the message recipient; and
participating in an authentication exchange to verify the identity of the client of the message recipient.

15. The method of claim 14, wherein the authentication exchange is performed in accordance with an identity federation protocol.

16. The method of claim 14, wherein the authentication exchange is performed in accordance with an open standard authentication protocol.

17. The method of claim 12, further comprising the first mail server of the message recipient sending a delivery acknowledgment to the client of the message sender.

18. The method of claim 11, wherein at least part of the communications between the client of the message sender and the first mail server of the message recipient utilizes the HyperText Transport Protocol.

19. An article of manufacture comprising a non-transitory processor-readable storage medium storing one or more software programs which when executed by a processor perform the steps of the method of claim 11.

20. An apparatus for handling electronic mail messages in an electronic mail system, the apparatus comprising:
a memory; and
a processor coupled to the memory and configured to execute a first mail server of a message recipient such that the first mail server when executed: establishes a secure connection between a client of the message sender and the first mail server of the message recipient, the first mail server of the message recipient being distinct from a second mail server associated with the message sender; participates in an authentication exchange to verify the identity of the client; upon successful verification of the identity of the client of the message sender, receives an electronic mail message sent by the client of the message sender;
wherein the first mail server of the message recipient and the client of the message sender communicate one-to-one at an application layer of the electronic mail system;
wherein the client of the message sender and the first mail server of the message recipient comprise respective endpoints in the application layer; and
wherein the first mail server of the message recipient receiving the electronic mail message sent by the client of the message sender does not require any server-to-server protocols between the first mail server of the message recipient and the second mail server associated with the message sender.

* * * * *